United States Patent
Evans et al.

(10) Patent No.: US 10,016,737 B2
(45) Date of Patent: Jul. 10, 2018

(54) WITHDRAWAL SYSTEM

(71) Applicant: Johnson Matthey Process Technologies, Inc., Savannah, GA (US)

(72) Inventors: Martin Evans, Savannah, GA (US); Charles Radcliffe, Savannah, GA (US)

(73) Assignee: Johnson Matthey Public Limited Company, London (GB)

( * ) Notice: Subject to any disclaimer, the term of this patent is extended or adjusted under 35 U.S.C. 154(b) by 268 days.

(21) Appl. No.: 15/059,964

(22) Filed: Mar. 3, 2016

(65) Prior Publication Data
US 2016/0256842 A1    Sep. 8, 2016

Related U.S. Application Data

(60) Provisional application No. 62/127,332, filed on Mar. 3, 2015.

(51) Int. Cl.
| | |
|---|---|
| *B01J 8/00* | (2006.01) |
| *C10G 1/00* | (2006.01) |
| *F28F 27/02* | (2006.01) |
| *C10G 11/18* | (2006.01) |

(52) U.S. Cl.
CPC ............ *B01J 8/0015* (2013.01); *B01J 8/003* (2013.01); *B01J 8/0035* (2013.01); *C10G 11/18* (2013.01); *F28F 27/02* (2013.01); *B01J 2208/00176* (2013.01); *B01J 2208/00212* (2013.01);
(Continued)

(58) Field of Classification Search
CPC ... B01J 8/00; B01J 8/0015; B01J 8/003; B01J 8/0035; B01J 2208/00–2208/00017; B01J 2208/00106; B01J 2208/00168; B01J 2208/00176; B01J 2208/00212; B01J 2208/00256; B01J 2208/00743; B01J 2208/00761; B01J 2208/00769; C10G 11/00; C10G 11/14; C10G 11/18; F28F 27/00; F28F 27/02
See application file for complete search history.

(56) References Cited

U.S. PATENT DOCUMENTS

| | | |
|---|---|---|
| 4,327,055 A | 4/1982 | Luckenbach et al. |
| 7,431,894 B2 | 10/2008 | Evans |
| 8,092,756 B2 | 1/2012 | Evans et al. |

(Continued)

FOREIGN PATENT DOCUMENTS

WO    2008058839 A2    5/2008

*Primary Examiner* — Natasha E Young
(74) *Attorney, Agent, or Firm* — Kevin M. Carroll

(57) ABSTRACT

A withdrawal system for withdrawing particulate matter from a high-temperature industrial process or withdrawing material from a cryogenic process such as a pharmaceutical manufacturing process is disclosed. The withdrawal system comprises a heat exchanger comprising an inlet end and an outlet end, a first collection vessel and a second collection vessel, a conduit from the outlet end of the heat exchanger to the first collection vessel and the second collection vessel. The conduit comprises a first valve that controls flow of particulate material into the first collection vessel and a second valve that controls flow of particulate material into the second collection vessel. When the first valve is open allowing flow of particulate material into the first collection vessel, the second valve is closed; and when the second valve is open allowing flow of particulate material into the second collection vessel, the first valve is closed.

7 Claims, 5 Drawing Sheets

(52) U.S. Cl.
CPC ............... *B01J 2208/00256* (2013.01); *B01J 2208/00761* (2013.01); *B01J 2208/00769* (2013.01)

(56) References Cited

U.S. PATENT DOCUMENTS

| | | | |
|---|---|---|---|
| 8,146,414 B2* | 4/2012 | Evans | .................. F28D 7/106 73/149 |
| 2010/0143050 A1* | 6/2010 | Force | .................. B01J 8/003 406/183 |

* cited by examiner

FIGURE 1: Withdrawal System having Two Collection Vessels
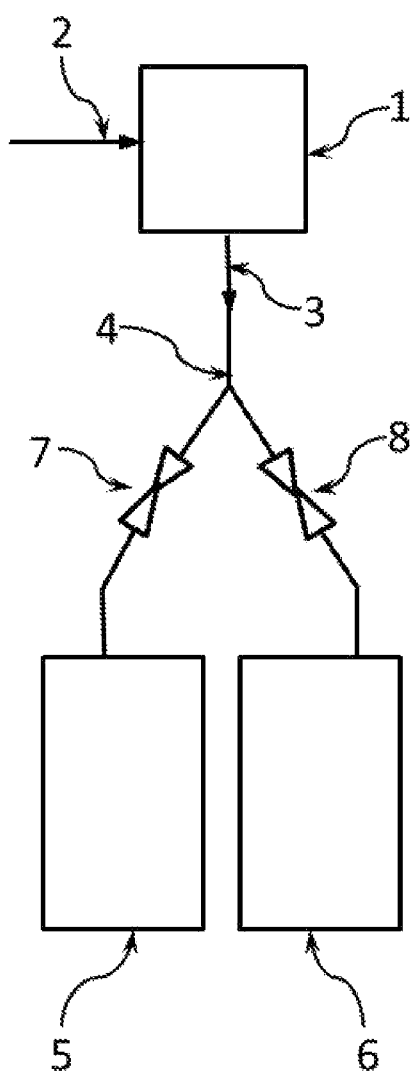

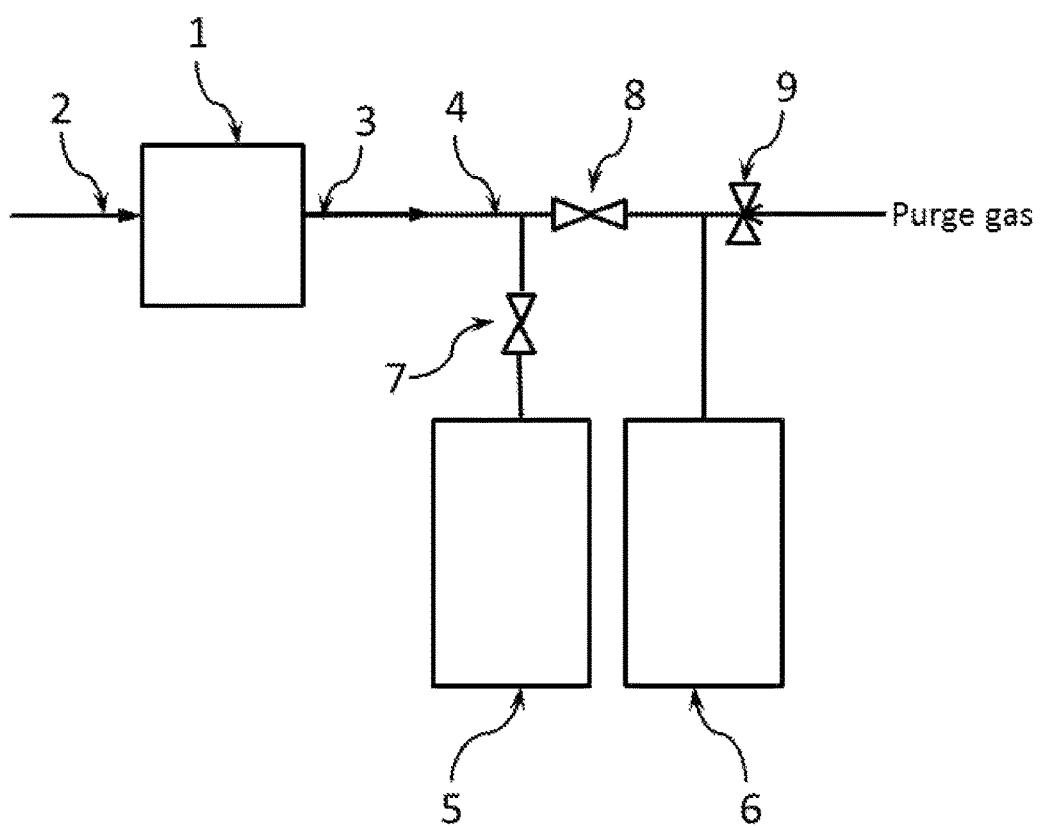
FIGURE 2: Withdrawal System with One Purge Line

FIGURE 3: Withdrawal System having Two Purge Lines
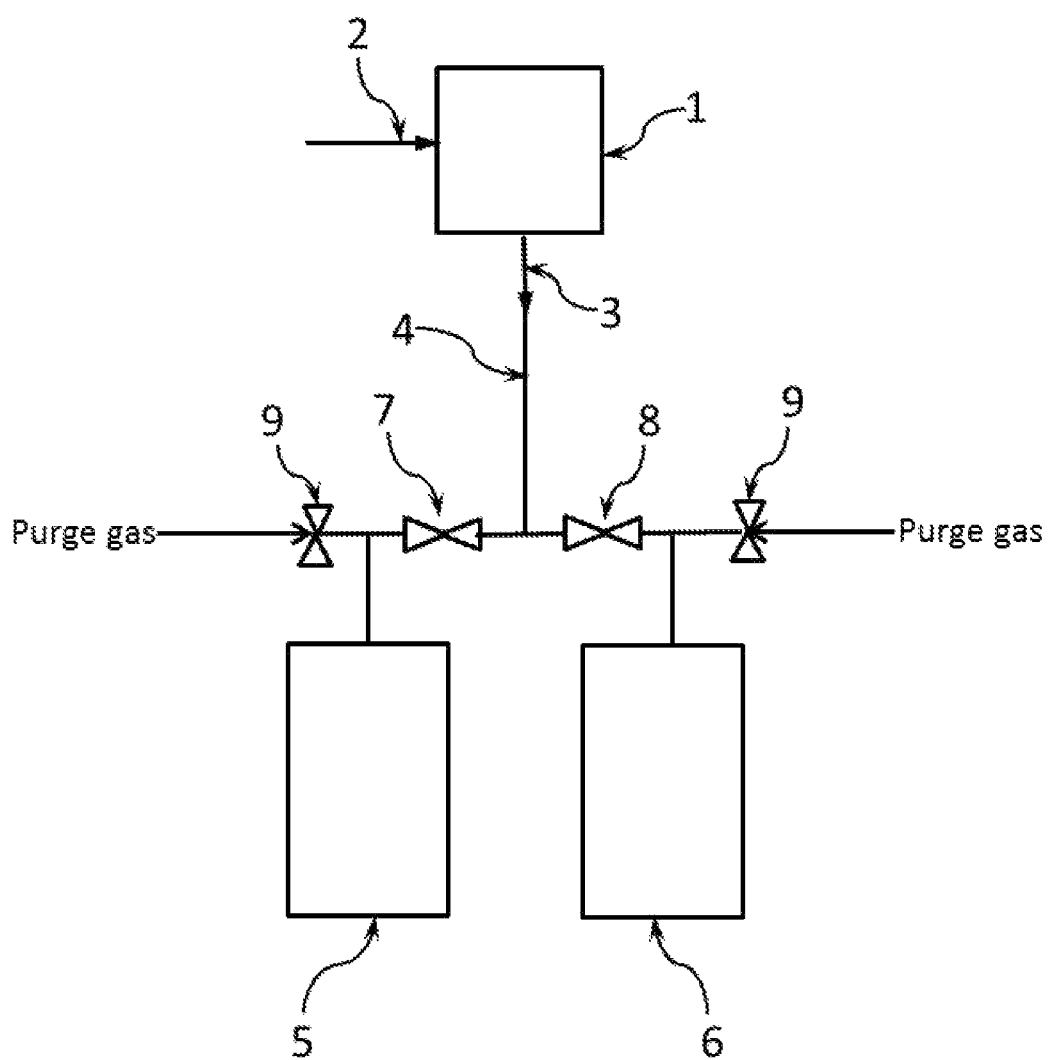

FIGURE 4: Heat Exchanger
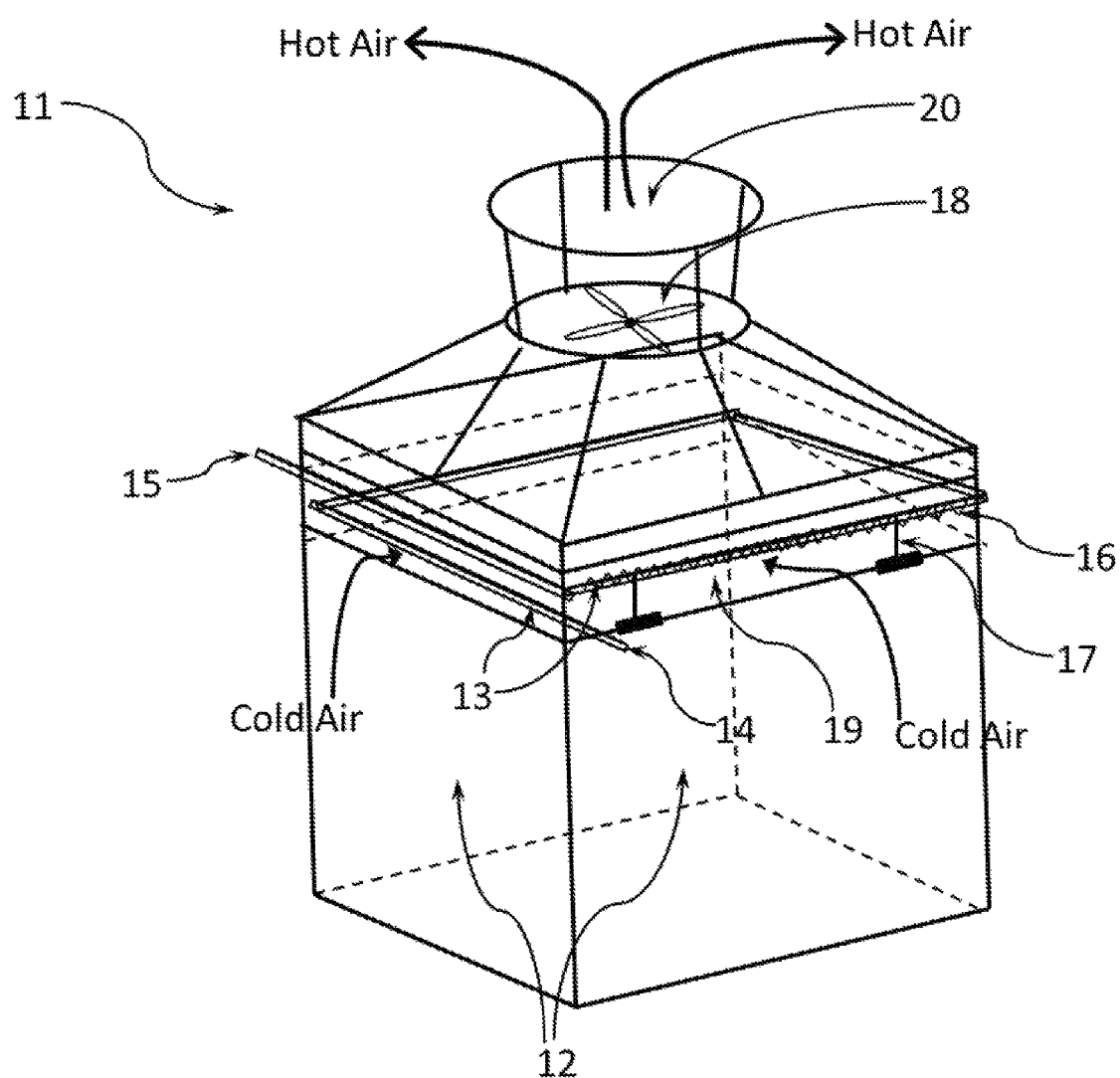

FIGURE 5: Blind Tee at Corner of Piping Circumference
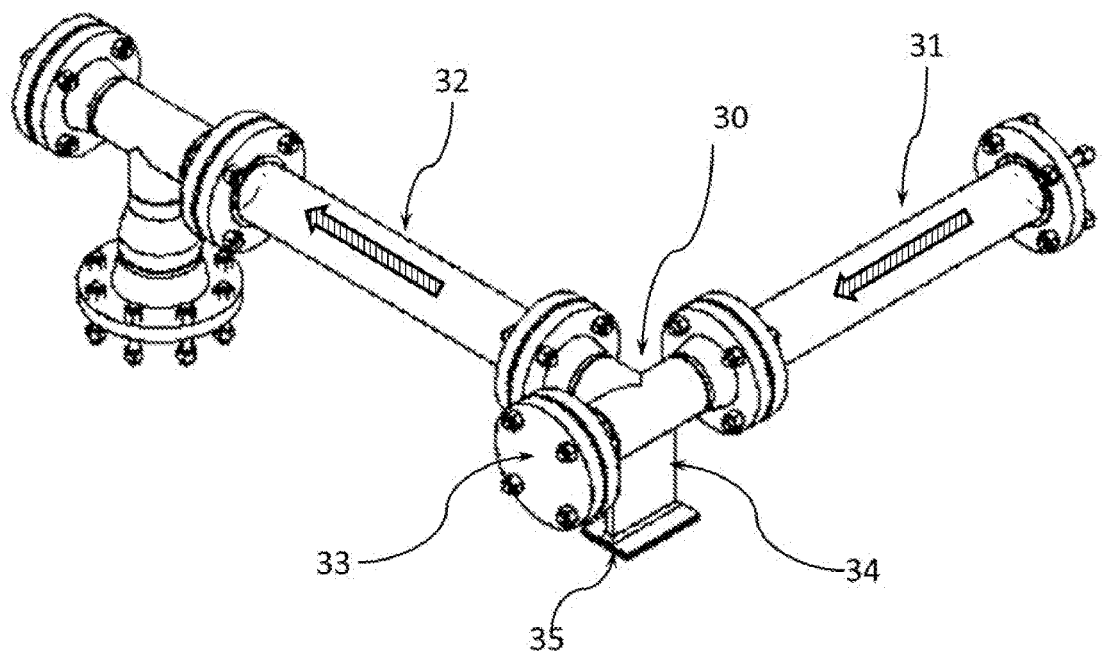

WITHDRAWAL SYSTEM

This application claims priority to U.S. Provisional Patent Application Ser. No. 62/127,332, filed Mar. 3 2015.

FIELD OF THE INVENTION

The invention is a withdrawal system, in particular for withdrawing particulate matter from a high-temperature industrial process such as a fluid catalytic cracking ("FCC") process or withdrawing material from a cryogenic process such as a pharmaceutical manufacturing process.

BACKGROUND OF THE INVENTION

A conventional fluid catalytic cracking system generally includes a fluid catalytic cracking (FCC) unit coupled to a catalyst injection system, a petroleum feed stock source an exhaust system, and a distillation system. The FCC unit includes a regenerator and a reactor. The reactor primarily houses the catalytic cracking reaction of the petroleum feed stock and delivers the cracked product in vapor form to the distillation system. Spent catalyst from the cracking reaction is transferred from the reactor to the regenerator to regenerate the catalyst by removing coke and other materials. The regenerated catalyst is then reintroduced into the reactor to continue the petroleum cracking process. The catalyst injection system maintains a continuous or semi continuous addition of fresh catalyst to the inventory circulating between a regenerator and a reactor.

During the catalytic process, there is a dynamic balance of the total catalyst within the FCC unit. For example, catalyst is periodically added utilizing the catalyst injection system and some catalyst is lost in various ways such as through the distillation system, through the effluent exiting the regenerator, etc. If the amount of catalyst within the FCC unit diminishes over time, the performance and desired output of the FCC unit will diminish, and the FCC unit will become inoperable. Conversely, if the catalyst inventory in the FCC unit increases over time or becomes deactivated, the catalyst bed level within the regenerator reaches an upper operating limit and the deactivated or excess catalyst is withdrawn to prevent unacceptably high catalyst emissions into the flue gas stream, or other process upsets. Thus, the typical fluid catalytic cracking system also contains a withdrawal apparatus suitable for withdrawing materials from one or more units, like FCC units.

U.S. Pat. No. 7,431,894 teaches a catalyst withdrawal apparatus and method for regulating catalyst inventory in a fluid catalytic cracking catalyst (FCC) unit. In this design, a heat dissipater is located adjacent the metering device and is adapted to cool catalyst entering the pressure vessel.

U.S. Pat. No. 8,092,756 teaches a catalyst withdrawal apparatus and method for regulating catalyst inventory in a unit. One embodiment of this catalyst withdrawal apparatus includes a vessel coupled to a heat exchanger.

U.S. Pat. No. 8,146,414 teaches a method comprising withdrawing material from a FCC unit to a heat exchanger coupled to the fluid catalytic cracking unit. The heat exchanger has a material inlet; a material outlet; a cooling fluid inlet and a cooling fluid outlet with respective temperatures. The method further comprises measuring the respective temperatures at the material inlet, material outlet, cooling fluid inlet and cooling fluid outlet of the heat exchanger; determining a change in temperature between the material inlet and material outlet and determining a change in temperature between the cooling fluid inlet and cooling fluid outlet; and correlating the change in temperature between the material inlet and material outlet and the change in temperature between the cooling fluid inlet and cooling fluid outlet to a metric of material withdrawn from the unit.

U.S. Pat. No. 8,146,414 further teaches that the cooled material may be moved to a collection vessel. The inventors have found that since the flow of catalyst in a typical withdrawal process is continuous until the collection vessel is full, the withdrawal process from the FCC unit has to be temporarily stopped once the collection vessel is full so that pressure can be applied to the storage vessel, in order to blow the catalyst out of it into the main refinery storage silo. Once the collection vessel is empty, the withdrawal process can begin again. The inventors have found that the heat exchange equipment operates at a steady (hot) temperature for several hours (as long as it takes to fill the collection vessel), followed by a short period when there is no source of heat, and so it will naturally cool down. After this, when withdrawal starts again the exchangers heat up and stay at high temperature for as long as it takes the collection vessel to fill up. This means that the exchanger skid experiences a "thermal cycle" of contraction and expansion every time the collection vessel fills up and needs to be emptied. For a system withdrawing 10 tons/day using a 5 ton collection vessel, this will result in two complete thermal cycles every day. Higher rates will result in even more frequent cycling. Every thermal cycle stresses the piping and pipe supports as the piping expands and contracts, and increases the likelihood of cracks developing, and subsequent weld failure. Similar problems are encountered with such a heat exchanger design when extremely cold streams need to be warmed, for example cryogenic liquids that need to be brought to room temperature or above. Even when the piping is designed with flexible supports to allow for the piping to expand and contract without creating excessive stresses, these supports have tendency to jam over time if not properly maintained. This increases the stresses and increases the likelihood of failure. There is therefore the need for a withdrawal system which reduces the number of temperature cycles which the heat exchanger portion is subjected to.

A further problem with thermal cycling occurs when certain alloys such as high carbon grades of stainless steel are used. It is well known that all H-grade austenitic stainless steels as well as some Fe—N—Cr alloys (alloy 800H/800HT, etc.) are susceptible to stress relaxation cracking (SRC) in the temperature range 550 to 750° C. The susceptible materials fail in a brittle manner and the cracks are always located in cold-formed areas or in welded joints. Most stress relaxation cracking failures occur within 1-year service. The major cause of relaxation cracking is lack of high temperature ductility. Many austenitic materials show an age hardening behaviour at temperatures between 500° C. and 750° C. Much of the piping on the inlet section of the heat exchanger section of the catalyst withdrawal system will operate within this temperature range, and will be subject to stress relation cracking.

The heat exchange portion of a catalyst withdrawal system is usually the most expensive portion of the system, as it has to be built using special metallurgy, using tightly controlled manufacturing techniques. It is therefore desirable to maximise the operational life of this equipment by reducing the cyclic stresses that is exposed to in normal operation.

Any invention which reduces the amount of thermal cycling of equipment operating in this critical temperature range is therefore highly desirable, as it will significantly improve operational reliability, decrease the risk of failure, and increase the level of safety of such a system.

It is therefore desirable to attain an improved withdrawal system for withdrawing particulate material from high temperature operations such as fluid catalytic cracking ("FCC") process. We have discovered a new withdrawal system for withdrawing particulate material from industrial processes.

SUMMARY OF THE INVENTION

The invention includes a withdrawal system for withdrawing particulate matter from a high-temperature industrial process or withdrawing material from a cryogenic process such as a pharmaceutical manufacturing process. The withdrawal system comprises a heat exchanger comprising an inlet end and an outlet end, a first collection vessel and a second collection vessel, a conduit from the outlet end of the heat exchanger to the first collection vessel and the second collection vessel. The conduit comprises a first valve that controls flow of particulate material into the first collection vessel and a second valve that controls flow of particulate material into the second collection vessel. When the first valve is open allowing flow of particulate material into the first collection vessel, the second valve is closed; and when the second valve is open allowing flow of particulate material into the second collection vessel, the first valve is closed. The invention allows for the flow of particulate material to be more continuous, to reduce thermal cycling, and to extend the life of the withdrawal equipment, especially the high cost heat exchanger equipment, which is typically manufactured using expensive metallurgy.

BRIEF DESCRIPTION OF THE DRAWINGS

FIG. 1 shows a withdrawal system having two collection vessels.

FIG. 2 shows a withdrawal system having one purge line.

FIG. 3 shows a withdrawal system having two purge lines.

FIG. 4 shows a heat exchanger useful in the withdrawal system of the invention.

FIG. 5 shows a blind tee (a pipe tee having one end sealed) at a corner of piping circumference.

DETAILED DESCRIPTION OF THE INVENTION

The invention includes a withdrawal system for withdrawing particulate matter from a high-temperature industrial process. Preferable high-temperature industrial processes include manufacture of pyridine and its derivatives the manufacture of acrylonitrile, methanol conversion processes to convert methanol to olefins or other products (MTX processes), fluid catalytic cracking (FCC) processes, and other chemical manufacturing processes. The particulate matter is preferably catalysts or additives that are added to the industrial process. The invention is particularly suited for cooling a mixture of powdered FCC catalysts and/or additives and air that is withdrawn from a fluid catalytic cracking process, which may be withdrawn from a FCC unit at temperatures of up to approximately 750° C., or catalysts and/or additives from MTX processes. The withdrawal system can also be used for withdrawing material from a cryogenic process such as a pharmaceutical manufacturing process. The material is preferably the product of the cryogenic process. For purposes of simplicity, the following description will focus on withdrawing particulate matter from a high-temperature industrial process. However, those skilled in the art will recognize the equal applicability of this design to withdrawing material from a cryogenic process.

The withdrawal system comprises a heat exchanger comprising an inlet end and an outlet end. The heat exchanger may be any heat exchanger known for cooling particulate material from a high-temperature industrial process or warming material from a cryogenic process. Preferably, the heat exchanger has a first pipe comprising a particulate material inlet and a particulate material outlet, wherein the first pipe is contained within a housing having a cooling fluid inlet and a cooling fluid outlet, as described in U.S. Pat. No. 8,146,414, the teachings of which are incorporated herein by reference. Preferably, the heat exchanger has sensors to measure the respective temperatures at the material inlet; material outlet; cooling fluid inlet and cooling fluid outlet, as also described in U.S. Pat. No. 8,146,414.

In a particularly preferred embodiment, the heat exchanger comprises a structure comprising a rectangular frame, preferably a square frame. The rectangular frame is preferably a metal frame. The rectangular frame supports piping, which completes at least one circumference around the rectangular frame. Preferably, the piping completes at least two circumferences around the rectangular frame.

The piping is supported to the frame on a series of moving supports. The moving supports are designed to allow the piping to move horizontally but limit movement vertically. The moving supports are preferably spring hangers or sliding plates. One configuration of moving supports consists of a shoe which is attached to the underside of the pipe, and a corresponding support plate supported off the main structure. The shoe is preferably arranged so that the flat surface of the shoe can slide on the support plate in the x or y direction in any horizontal plane. This movement of the shoe on this plane is ideally unconstrained, although in some circumstances it may be preferable to restrict the degree of movement to prevent the shoe from slipping off the support plate. Preferably, there is a low friction coating applied to the base of the shoe and the upper surface of the support plate, to allow the shoe to move freely. Examples of such coatings might be PTFE, graphite, or other similar low friction materials.

As the piping heats up as hot particulate matter moves through the piping, the net effect of thermal expansion of the pipe will be to elongate each side of the rectangular frame. The use of the series of moving supports allows to piping to be free to elongate as the piping expands, and thus allows for this expansion. Preferably, there will be a limited number of fixed support points to keep the whole structure rigid, including at the inlet end and at the termination of each complete circumference. However, these could be located at various locations to help control the movement. The rectangular shape grants an inherent stability of shape to the piping, allowing sufficient movement to handle expansion without allowing the loops to break free from the structure. This means that the moving supports do not need to be too restrictive. As all four sides of the piping circumference expand together, this results in the piping moving slightly away from the frame and the whole "rectangular" circumference of piping may move a few inches outwards, away from the supporting structure. Anyone skilled in the art of designing piping supports will understand how to support the piping in this invention.

The piping comprises a piping inlet end and a piping outlet end. The piping inlet end is preferably connected to the industrial process, and in particular to the regenerator of an FCC unit. The piping outlet end of the piping is connected to two or more collection vessels.

The piping may be arranged so that after one complete circumference of the frame, the outlet end of the piping is just above the inlet end of the piping; alternatively, the piping may be arranged so that after one complete circumference of the frame, the outlet end of the piping is just below the inlet end of the piping. This spiral arrangement allows for the tubes to be located in close proximity to each other in the vertical direction. This is ideal for minimizing the amount of cooling air that bypasses around the cooling fins. The vertical offset between each successive piping circumference is ideally set to closely match the overall height of each section of finned piping.

Preferably, at each corner of each piping circumference (i.e., at the corners of the rectangular frame) the piping will be connected with a pipe tee with one end sealed (a "blind tee", as known in the art) to ensure that erosion from the powder flowing inside the piping is minimized. In conventional liquid or gas flow piping service changes in direction are made by the use of short radius, or long radius pipe elbows. While these elbows can be used in service where powders are transported in air, they are very prone to erosion. The preferred design is to use a pipe tee instead of an elbow in this service, where the tee is arranged with one end sealed using a blind flange. In this way, the catalyst that flows into the tee fills up the blind end. As additional catalyst flows into the tee it is then forced to turn by bouncing off the catalyst that has settled inside the blind tee. This means that the erosional force of the catalyst flow is expended on the packed bed of catalyst in the tee, rather than on the piping walls. This results in significantly reduced piping erosion. These tees will also help to dissipate piping stresses.

The piping contains external cooling fins. These fins are attached to the exterior surface of the pipe in a conventional manner that will be very familiar to those who are skilled in the art of manufacturing conventional air-cooled heat exchangers. The fins are typically external projections on the piping that extend the surface in contact with the cooling/heating medium (i.e., ambient air). These fins can be lateral fins of various thicknesses, sizes and materials; they can be circular, square or with serrated edges; in addition the fins may include studs, pegs and other shapes which help to maximize the transfer of heat between the ambient air and the fluid particulate mixture, as determined in the art of designing heat exchangers. The material of the fins is selected to allow maximum heat transfer, and the shape and attachment of the fins is designed to withstand the cyclic thermal stresses involved in such a service. The use of external fins allows for rapid cooling (or rapid heating) of the piping contents. Heat lost will go to ambient air.

Preferably, the length of the piping and number of circumferences can be tailored to the particular application. For example, if the cooling requirement is low, maybe only 1 to 4 circumferences are needed. If the cooling requirement is high, 8 or 10 circumferences may be needed.

The rectangular frame heat exchanger also comprises one or more fans, which allows the cooling of the finned piping to be enhanced by drawing in ambient air over the fins on the piping. The velocity of air to be maintained over the fins is preferably a design variable. There is a trade-off between the power and size of the fan, and the heat exchange area required. For example, increasing the air velocity through the use of a larger, more powerful fan will result in more heat transfer, and reduce the number of circumferences required. However, as velocity continues to increase, the extra benefits gained become smaller.

Preferably, the fan is centrally located on the structure above the piping. An alternative arrangement is where the fan is arranged to blow cold air into the structure, instead of extracting hot air from the structure. In such an arrangement, it may be preferable to locate the fan underneath the structure instead of on the top.

When the rectangular frame is square in shape, one fan is preferably used. When the frame is a true rectangle, two or more fans are preferably used for optimum cooling/warming.

The structure is sealed except for where the finned piping is located, such that the sides of the structure are sealed except for openings in the structure for where the finned piping is located. This vent allows the cooling air to enter or leave the structure, such that the gaps in the sides around the finned piping allow the air that is drawn in by the fan to contact the finned piping at the maximum possible velocity.

Preferably, the rectangular frame heat exchanger is supported off the ground on one or more legs.

The withdrawal system also comprises a first collection vessel and a second collection vessel. The first and second collection vessels may be any collection vessel capable of receiving the withdrawn powder or catalyst at the appropriate process conditions. If the heat exchanger capacity of the withdrawal system is limited, the collection vessels may need to be manufactured out of materials which are capable of withstanding high temperature. Non-limiting examples include 304 or 316 stainless steels, in standard or high carbon grades. In a preferred configuration, there is enough heat exchanger capacity to allow the temperature to be low enough for these vessels to be manufactured from carbon steel. There is a trade-off here between the extra cost of adding heat exchanger capacity, and the reduced cost of being able to use cheaper materials of construction for the receiving vessels. In general, it is expected to be more economical to add extra heat exchanger capacity to allow these vessels to be manufactured from carbon steel. This allows the overall cost of manufacturing for the complete system to be minimized.

These collection vessels will preferably have dust collection capabilities to clean up the vent stream from these vessels, to prevent any of the catalyst that is being withdrawn from the FCC from entering the atmosphere. Such a dust collection system could consist of a common filter external to the two receiving vessels. In a preferred configuration each vessel will have its own filter. Suitable filters for this service include bag filters, ceramic filters, or sintered metal filters, with sintered metal filters being the preferred method of dust control.

The collection vessels are preferably weighed continuously through the use of load cells, although other methods of detecting the level of catalyst in the vessel can be employed. These collection vessels are ideally pressure vessels designed to withstand a high enough pressure to allow the catalyst that is collected in the vessels to be transported to the main storage silos whenever they are full. Typical design pressures would range from 40 psi to 150 psi, with the lower pressure being preferred to minimize fabrication costs. These vessels will preferably be operated at a controlled pressure during the withdrawal process to regulate the flow of catalyst out of the FCC process, as taught in U.S. Pat. No. 8,092,756, the teachings of which are incorporated by reference. This pressure control can be accomplished by several different methods well known to those skilled in the art. Preferably, such control is obtained by the operation of a control valve on the outlet side of the filter on the vent line from said vessel.

The withdrawal system also comprises a conduit from the outlet end of the heat exchanger to the first collection vessel and the second collection vessel. The conduit preferably comprises conduit pipe that allows the flow of particulate material from the heat exchanger into the first and second collection vessel. Such conduit piping should ideally have the minimum number of elbows and elevation changes to minimize the pressure drop in this conduit piping. Some applications may use finned tube in this section of conduit piping to provide heat transfer capacity over and above that provided by the heat exchanger.

The conduit comprises a first valve that controls flow of particulate material into the first collection vessel and a second valve that controls flow of particulate material into the second collection vessel. When the first valve is open allowing flow of particulate material into the first collection vessel, the second valve is closed; and when the second valve is open allowing flow of particulate material into the second collection vessel, the first valve is closed.

When the first collection vessel is full, the catalyst withdrawal flow is redirected instantaneously to the second collection vessel. This allows the first collection vessel to be pressurized, discharged, and returned to operating pressure ready and waiting for the second collection vessel to become full. When the second collection vessel becomes full, the catalyst withdrawal flow is redirected instantaneously to the first collection vessel. This allows the second collection vessel to be pressurized, discharged, and returned to operating pressure ready and waiting for the first collection vessel to become full.

Preferably, the conduit downstream of the first valve into the first collection vessel or the second valve into the second collection vessel is self-draining under the force of gravity. This will help ensure that when the flow of particulate material to one vessel is shut off, and the flow diverted to the other vessel, the amount of particulate material in the "stagnant" conduit is minimized. In another configuration, an additional compressed air supply is used to purge the unused section of conduit clear of catalyst as required, when the flow is switched from one collection vessel to the other. Such a flow would typically be switched on temporarily just before, at the same time, or just after the valves are operated to divert the flow from one collection vessel to the other. This would be allowed adequate time to purge any catalyst from the "dead" section of conduit before being switched off.

Preferably, the withdrawal system includes one or more first sensors coupled to the first collection vessel and one or more second sensors coupled to the second collection vessel. These sensors are configured to provide a metric indicative of particulate material in the vessels. Non-limiting examples of sensors, for illustration and not limitation, include a load cell, a differential pressure sensor, flow sensor, and a level sensor, either individually or in a combination thereof. For instance, the first and second collection vessels may include sensors configured to detect when the level of particulate material within the first and second collection vessels exceeds an upper threshold. The sensor may be a differential pressure measurement device, optical transducer, a capacitance device, a sonic transducer or other device (e.g., a nucleonic level detector) suitable for providing information from which the level or volume of particulate material in the first or second collection vessels is high. The sensor may also include one or more load cells adapted to provide a metric indicative of the weight of particulate material in the first and second collection vessels. The load cells may be coupled to a plurality of legs that supports the first or second collection vessels above a surface such as a concrete pad. Each of the legs may have one load cell coupled thereto.

Preferably, the withdrawal system comprises a controller that receives the outputs from the one or more first sensors and the one or more second sensors, and can open and close the first valve and the second valve in response to the amount of particulate material in each of the vessels.

The withdrawal system of the invention provides numerous advantages. When only one collection vessel is used, the collection vessel size is typically always maximized, in order to minimize the number of thermal cycles that the system is exposed to. In the withdrawal system of the invention, the collection vessels can be made significantly smaller; and at a minimum, each only needs to hold the amount of particulate material that is discharged from the high-temperature operation during the time required for one of these collection vessels to pressurize, discharge, and be returned to operating pressure ready to go back into service. When only one collection vessel is used, the exchanger skid was always subjected to thermal cycling, several times a day. In the withdrawal system of the invention, the withdrawal of particulate material can become truly continuous, allowing the number of thermal cycles which the exchanger skid experiences to be limited to once a year, or even less frequently. This will significantly improve the mechanical reliability of the system by subjecting the heat exchanger (which is likely to be the most expensive part of the system) to fewer thermal expansion and contraction cycles. In the withdrawal system of the invention, the only part of the process that is subject to any significant cycling is the collection vessels which are designed for relatively low temperatures compared to the exchanger skid.

Thus, the withdrawal system of the invention will result in significantly improved reliability of the main exchanger skid, through a reduction in the frequency of cyclic stresses caused when expanding and contracting (thermal cycling).

The provision of continuous withdrawal, instead of semi-continuous operation in previous inventions, also allows this invention to be applied to additional processes which of necessity require that the purge of material is continuous.

FIGS. 1-3 illustrate three different embodiments of the present withdrawal system of the invention, for withdrawing particulate matter from a high-temperature industrial process or from a cryogenic process. In each figure, the withdrawal system comprises a heat exchanger (1) having an inlet end (2) and an outlet end (3). The withdrawal system has a conduit (4) from the outlet end of the heat exchanger (3) to a first collection vessel (5) and a second collection vessel (6). Conduit (4) comprises a first valve (7) that controls flow of particulate material into the first collection vessel and a second valve (8) that controls flow of particulate material into the second collection vessel. When the first valve (7) is open allowing flow of particulate material into the first collection vessel (5), the second valve (8) is closed; and when the second valve (8) is open allowing flow of particulate material into the second collection vessel (6), the first valve (7) is closed.

FIG. 1 illustrates a self-draining system in which the conduit pipe downstream of the first valve (7) into the first collection vessel (5) or the second valve (8) into the second collection vessel (6) is self-draining under the force of gravity. FIG. 2 illustrates a withdrawal apparatus having a purge line comprising a purge valve (9) and a purge gas supply. When second valve (8) is shut off causing the flow of particulate material to the second collection vessel (6) to be shut off, the purge gas (e.g., compressed air supply) can be used to purge material that has collected in the unused section of conduit. FIG. 3 illustrates a withdrawal system having two purge lines comprising two purge valves (9) and purge gas supply.

One example of the heat exchanger useful in the invention is demonstrated in FIG. 4. FIG. 4 shows a heat exchanger (11) that has a structure comprising a solid rectangular frame (12). The heat exchanger has piping (13) that completes one circumference around the rectangular frame (12). The piping has an inlet end (14) and an outlet end (15). The piping contains external cooling fins (16) that are demonstrated on just one side of the piping circumference. The piping is supported to the frame on a series of moving supports (17). The heat exchanger of FIG. 4 is shown to have one fan (18) for circulating air across the piping in order to warm or cool the contents that move through the piping. The structure is sealed except for where the piping is located. The opening (19) allows for cool air to flow over the piping and hot air to be extracted from an exhaust vent (20) connected to the one or more fans.

FIG. 5 illustrates the blind tee at the corner of the piping circumference. The blind tee (30) connects piping on one side of the piping circumference (31) with piping on the connected side (32). The blind tee is arranged with one end sealed using a blind flange (33). The use of a blind tee ensures that erosion from the powder flowing inside the piping is minimized. The flow of powder is illustrated by the flow of the arrows within the illustrated piping. The blind tee works by allowing the catalyst that flows into the tee fills up the blind end, and then as additional catalyst flows into the tee it is then forced to turn by bouncing off the catalyst that has settled inside the blind tee. FIG. 5 also illustrates the moving support (34) that is attached to the underside of the piping. The moving support consists of a shoe (35). The shoe can slide on a support plate that is attached to the structure of the heat exchanger on the frame.

We claim:

1. A withdrawal system for withdrawing particulate matter from a high-temperature industrial process or for withdrawing material from a cryogenic process, said withdrawal system comprising:
    (a) a heat exchanger comprising an inlet end and an outlet end, and
        (i) a structure comprising a rectangular frame;
        (ii) piping that is supported by the rectangular frame and completes at least one circumference around the rectangular frame, wherein the piping is supported to the frame on a series of moving supports, and the piping comprises a piping inlet end and a piping outlet end, and the piping contains external cooling fins; and
        (iii) one or more fans,
            wherein the structure is sealed except for where the piping is located;
    (b) a first collection vessel and a second collection vessel; and
    (c) a conduit from the outlet end of the heat exchanger to the first collection vessel and the second collection vessel; and
    wherein the conduit comprises a first valve that controls flow of particulate material into the first collection vessel and a second valve that controls flow of particulate material into the second collection vessel; and when the first valve is open allowing flow of particulate material into the first collection vessel, the second valve is closed; and when the second valve is open allowing flow of particulate material into the second collection vessel, the first valve is closed.

2. The withdrawal system of claim 1, wherein the conduit downstream of the first valve into the first collection vessel or the second valve into the second collection vessel is self-draining under the force of gravity.

3. The withdrawal system of claim 1, wherein the particulate matter comprises catalysts and/or additives from a fluid catalytic cracking (FCC) process.

4. The withdrawal system of claim 1, wherein the material from a cryogenic process comprises a product of a pharmaceutical manufacturing process.

5. The withdrawal system of claim 1, wherein the particulate matter comprises catalysts and/or additives from a methanol conversion process.

6. The withdrawal system of claim 1, further comprising one or more first sensors coupled to the first collection vessel and one or more second sensors coupled to the second collection vessel, wherein the first and second sensors are configured to provide a metric indicative of particulate material in the first and second collection vessels.

7. The withdrawal system of claim 6, further comprising a controller to receive outputs from the first and second sensors.

* * * * *